Dec. 23, 1930.    C. K. WELCH    1,786,101
PNEUMATIC TIRE AND WHEEL
Filed May 7, 1923    7 Sheets-Sheet 2

Dec. 23, 1930.  C. K. WELCH  1,786,101
PNEUMATIC TIRE AND WHEEL
Filed May 7, 1923  7 Sheets-Sheet 6

Dec. 23, 1930.  C. K. WELCH  1,786,101
PNEUMATIC TIRE AND WHEEL
Filed May 7, 1923   7 Sheets-Sheet 7

Patented Dec. 23, 1930

1,786,101

UNITED STATES PATENT OFFICE

CHARLES KINGSTON WELCH, OF COVENTRY, ENGLAND; ANNIE GERTRUDE WELCH AND ROLAND WELCH ADMINISTRATORS OF SAID CHARLES K. WELCH, DECEASED

PNEUMATIC TIRE AND WHEEL

Application filed May 7, 1923, Serial No. 637,347, and in Great Britain May 17, 1922.

My invention relates to pneumatic tires and wheels suitable for various vehicles such as light and heavy motor cars, motor cycles, pedal cycles, aeroplanes, etc.

One of the main objects of my invention is to reduce shock, recoil and vibration caused by or as a result of air inflated tires or wheels encountering and passing over irregularities or on obstructions on the surface along which the vehicle is travelling.

According to the main feature of this invention I provide means whereby the inflation pressure of a pneumatic tire on a vehicle wheel can be automatically reduced or lowered synchronously with the flexing of the tire induced by varying unevenness or irregularity of the surface of the road over which the tire travels. The said means may comprise a secondary air chamber which is generally mounted on and carried by the vehicle wheel and is normally inflated to the same pressure as that in the tire, communication between the tire and the chamber being through a passage which is so controlled that air can be thrust or injected from the tire due to flexing of the latter and reserved or stored in the said chamber which therefore automatically becomes a reservoir in relation to the tire itself. The said chamber may therefore be regarded as an autogenous or automatically constituted reservoir and throughout the specification the chamber is mostly referred to as a reservoir. When the wheel is at rest, the air in the tire and the air in the reservoir will be in a state of equilibrium, and theoretically when the wheel is revolving with the tire in contact with a flat surface the air in the tire and the reservoir should be in equilibrium. In practice, however, this state of equilibrium is not likely to exist mainly for the reason that truly flat road surfaces are not met with.

The control of the air flow between the tire and the secondary chamber to enable the latter to become automatically a reservoir in relation to the tire, may be effected by restricting means such as a very fine opening or orifice, in the nature of a bleed hole, the size of which may vary according to the capacity of the tire or the normal inflation pressure therein, or the results desired. The communicating passage may be controlled or regulated by a valve or other devices, the general effect or operation of the restricting means being such that the air is thrust or injected from the tire into the reservoir more or less freely, whereas the return of the air from the reservoir to the tire is slower or retarded. Therefore, the flexing of the tire when travelling over more or less uneven surfaces will cause air to be automatically transferred or injected from the tire through the restricting means into the said secondary chamber wherein the transferred or injected air tends to be retained, so that portions of air are reserved or stored in the chamber which therefore as aforesaid automatically becomes a reservoir relatively to the tire, the mean pressures of the air in the tire and the chamber or reservoir perpetually or continuously varying synchronously with the varying conditions of the road surface. The more violent the flexing of the tire the higher the mean pressures in the reservoir with correspondingly lower pressures in the tire. The rapidity with which the injections of air from the tire into the reservoir takes place is an important factor in the storing or reserving of the air in the reservoir and in the raising of the mean pressures of the air in the reservoir relatively to the pressures in the tire. The air injected from the tire into the reservoir at high speeds through the restricting means or resistance device cannot always return to the tire at the same rate; therefore the pressures of the air in the reservoir will be raised to approximately the maximum pressures or thrusts of the strongest or most violent injections of air into the reservoir induced by the flexing of the tire when passing over the highest crests or obstacles on the road. It will be understood that with a series of air injections in rapid succession, the air will not have time to return between each impulse or injection; the reserve of air transferred to the reservoir may return to the tire at varying speeds while the wheel is travelling over a series of smaller wave crests or concavities as the case may be, thus creating for a period a continuous pressure between the wheel rim and the flexed portion of the tire in contact with the road, such pressure acting quite independently of the weight of the vehicle. From the foregoing description it will be understood that during the running of the tire, the balance of air between the tire and the reservoir is automatically and incessantly altered and upset by the flexing of the tire according to the road surface and restoration of the normal state of equilibrium can only take place when flexing of the tire ceases.

The aforesaid restricting means for resisting the flow of air may comprise a movable member (spring controlled or otherwise) which may be moved by the transfer of air from the tire to the reservoir to allow the air to flow through orifices or openings of a certain area and which can be moved by the return of the transferred air so as to reduce the area of the said orifices or openings by closing one or more of the latter thereby restricting or retarding the return of the air from the reservoir to the tire. For this purpose I may provide a valve in the form of a disc having a small opening or openings and adapted to open a number of openings through which air flows from the tire into the reservoir and to close the same when the air returns to the tire so that the return flow takes place only through the small opening or openings in the disc valve.

Instead of providing a disc valve I may provide a valve in the form of a fluted cylinder so that the air in passing from the tire to the reservoir may flow along the flutings or grooves in the cylinder into the reservoir, but upon the flow of air taking place in the other direction, the fluted cylinder or valve is moved against a suitable seating so that the air only passes into the tire through a small or restricted bore or hole in the said cylinder or valve to give the desired resistance. In another modification the valve may be in the form of a ball which is displaced from a seating around the air passage by the air travelling from the tire to the reservoir, which ball valve is moved in the opposite direction by the return flow of the air or by a spring to close the said air passage so that the return flow takes place through a small orifice or bleed hole, adjacent to the said seating. Various other forms of valves may be provided to permit of more or less free but resisted slow flow of air in one direction and a more retarded flow in the opposite direction. In modifications of my invention I may dispense with the valve between the reservoir and the inner tube and employ instead an orifice forming an equal resistance passage in both directions which orifice or passage may be made adjustable if desired. Or I may fit in any suitable place in the connecting passage between the tire and the reservoir, a device that will by reason of its formation allow air to pass more freely one way than the other.

In carrying out my invention I may use arched pneumatic tire covers provided with inextensible edges similar to those described in the specification of my English Patent No. 14,563 of 1890 and other patents, either with or without modification. In particular I may use the type of tire cover having inextensible edges, which is now known as the straight sided tire cover. I may employ however covers with beaded edges with or without modification, or I may construct or provide any suitable means for securing the covers to the rims or reservoir. The rims may be of any section to suit the covers employed and they may be the same as or similar to those now in vogue.

The air reservoir may be constructed in many different ways and may be made rigid or flexible and the arrangement of the reservoir in relation to the tire is such, that a rigid partition or member is formed between the interior of the tire and the interior of the reservoir, which partition is generally but not always constituted by the wheel rim, and may contain or be connected to the passage establishing communication between the tire and the reservoir.

I may form annular air reservoirs integrally with the rims by welding or otherwise securing approximately U-shaped or other endless sections of steel or other metal on the inner circumference of the rim, and the rim or the reservoir may be made with flanges. I may in some cases make the reservoir integrally with the hubs of the wheels and connect them to the tires by suitable connections or air passages. The reservoirs need not be of endless or annular form, but may be made of any suitable shape and detachable if required. Moreover inextensible rubber tubes or chambers may be fitted within the wheels.

My invention is particularly suitable in connection with large pneumatic tires (now often referred to as giant tires) for heavy vehicles. These tires are obviously made large in transverse section in order to provide a wide tread surface in contact with the road and as now made, are proportionally deep internally for the purpose of obtaining the desired cushion of air. They are however dangerous in some cases owing to the deep drop occasioned by sudden deflation. By my invention, in addition to the advantages above described, I may avoid or considerably reduce this danger by providing a convexity or annular projection within the tire which may be formed by the periphery of an annular metal reservoir projecting beyond and between the edges of the tire cover towards the crown of the arch, but leaving sufficient space to avoid contact under ordinary conditions of running. In the event of a sudden deflation of the tire the vehicle would only drop to the extent of the distance between the crown of the tire and the said convexity, a further advantage being that the edges of the cover would not be so liable to damage. Flanges in conjunction with locking rings may be provided on the reservoir for securing the cover but any suitable or usual means may be employed for this purpose. In a modification I may keep the reservoir below or radially within the edges of the cover and fit between the said edges a detachable convexity which may be in the form of a solid rubber ring or tire; this convexity may be left loose or made fixable at will. Both in the first and second case the air space within the tire cover is obviously reduced, but this is more than compensated for by the action of the extra air contained within the reservoirs which may if required occupy the whole available space within the wheels. In a further modification applicable to various types and sizes of wheels I may place incompressible reservoirs within the base of the inner tubes and I may extend the reservoirs to any desired depth within the wheels. In building wheels according to this invention the metal portions of the wheels proper may form jackets or containers within which expansible or inexpansible air tight rubber tubes forming the air reservoirs may be fitted. Or I may in some cases line these jackets or containers with suitable thin metal to make them air tight so that they serve as the reservoirs.

In a further modification I may construct expansible chambers with reinforced rubber tubes, diaphragms, or a series of such diaphragms collapsed by suitable springs strong enough to resist the pressure of air within the inner tube of the tire. Such chambers may be fitted with the various devices herein described and may take the place of rigid reservoirs or other chambers of large dimensions. The spring devices can be made adjustable.

In some cases the beads or edges of the tire cover may be of different diameters and the rim of which such a tire is fitted may be slightly coned to suit the different diameters, this construction being particularly applicable in the case of straight sided tires which are held on the rim by means of detachable flanges.

The various constructions and arrangements of the reservoirs constitute important features of the invention, and I have illustrated in the accompanying drawings several different designs comprising novel features. Generally stated, the capacity of the reservoir should be as large as possible within the limited space available in or on the wheels and to give the best results the reservoirs should have a capacity approximating that of the tire. For ordinary motor car wheels the reservoirs must be as light in weight as possible and therefore must be circular or approximately circular in cross section in order to conform to the natural tendency of air under pressure otherwise the pressure of air would distort the reservoir and render it liable to burst. In order to obtain the maximum air capacity available with a reservoir of this formation, I place it as closely as convenient for fitting within the inner side of the rim and in a position to occupy space on each side of the track line or vertical plane of the tire, so that it will be clear of the brake drum (and the heat generated by the brake) or the steering mechanism whilst it does not project at the outside of the wheel where it would be liable to damage due to contact with curbs or other obstacles or would be in the way when attaching or detaching the tire. Such arrangements are of considerable importance in producing an efficient and practical design suitable for most types of motor car wheels. The means for connecting the reservoirs to the tires and the different constructions of the restricting means as hereinafter described are also important features of my invention.

In order that the invention may be clearly understood and readily carried into effect the same will now be described more fully with reference to the accompanying drawings in which:—

Throughout the various figures illustrated in the drawings, A generally indicates the pneumatic tire, B the wheel rim, C the air reservoir and D generally indicates the restricting device or means of resistance which is interposed between the pneumatic tire A and the reservoir C.

Figures 1, 3:
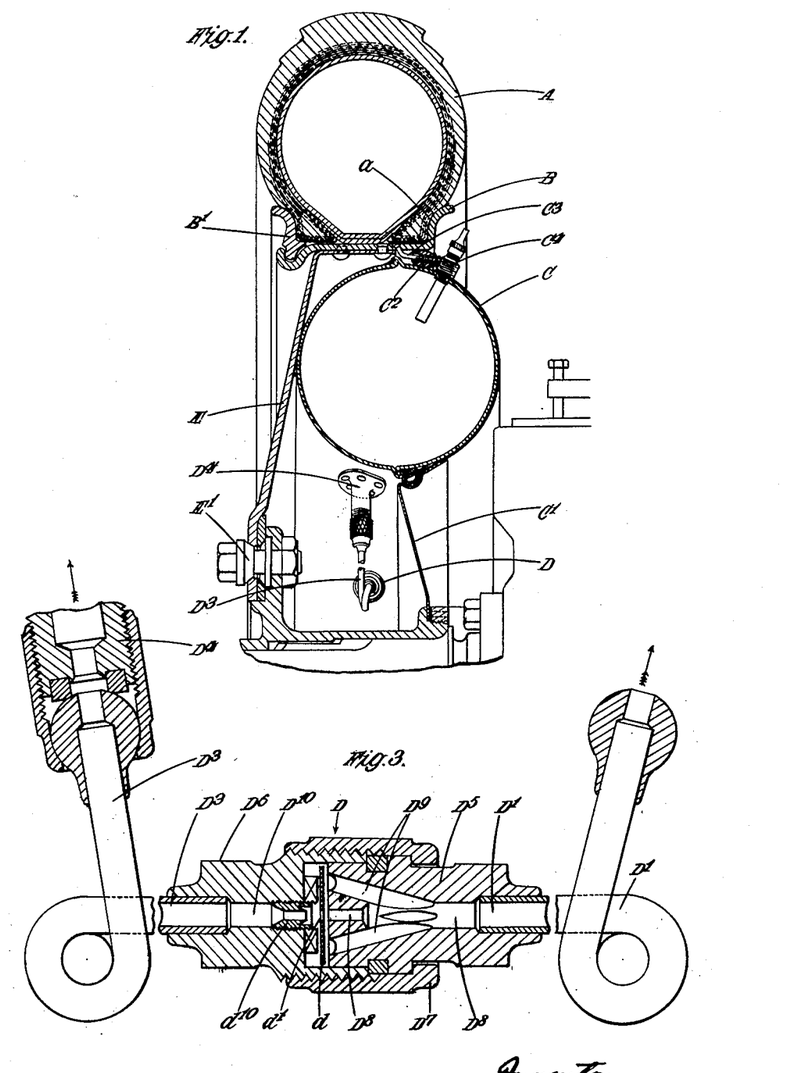
Figures 1 and 2 are respectively a fragmentary sectional view and a fragmentary front view (partially in section) of one construction of a wheel with one embodiment of the invention applied thereto.
Figure 3 is a sectional detail view of one construction of valve or restricting device for affording the desired resistance.
Figure 2:
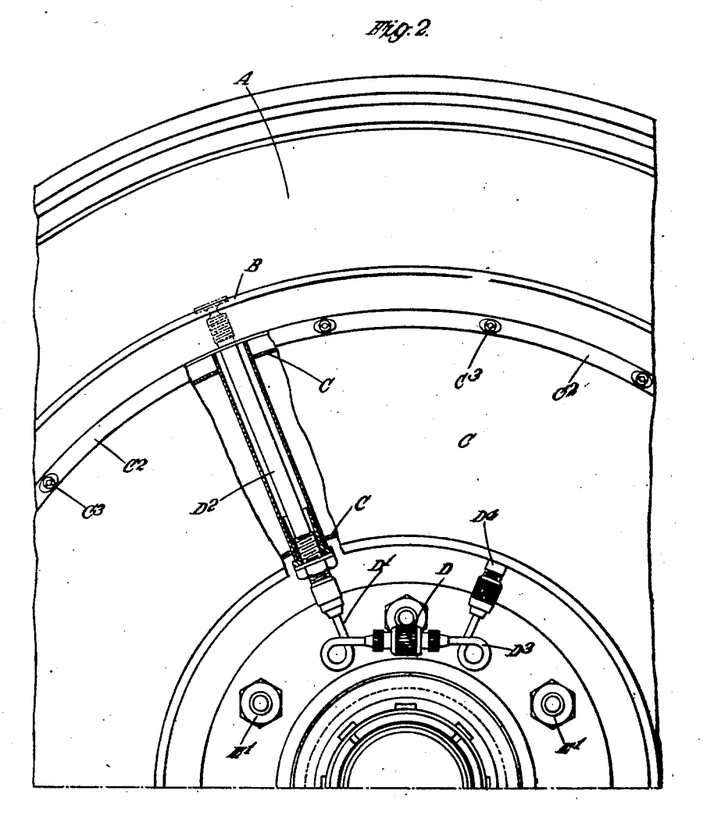

Referring more particularly to the example illustrated in Figure 1 the wheel is of the single disc type, the disc E being secured to a flange on the wheel hub in any suitable or usual manner, for example by bolts E', the outer part of the disc having attached thereto in any suitable or usual manner, the rim B which as shown in this figure is adapted to receive the well known form of straight sided tire cover A which is retained in position by a split detachable flange ring B' fitting in a circumferential groove formed at one edge of the wheel rim. The reservoir C which is of annular formation and circular cross section is constructed of two metal portions welded or otherwise secured together, the reservoir so formed being retained radially and concentrically within the rim B by means of a rubber, leather or other packing ring $C^2$ or the like secured between the reservoir C and the rim B by small bolts $C^3$ attached to the rim and having securing nipples or nuts as shown in Figure 1. A coned ring C' (forming a dust shield) is secured to the wheel hub and engages with the reservoir C as shown.

Figure 18:
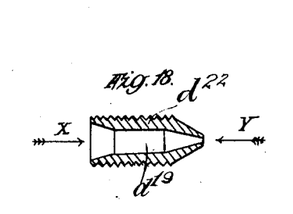
Figures 18, 19, 20, and 22 are sectional views of different forms of restricting devices which may be used instead of valves.

The aforesaid valve or means of resistance D is connected to the inner tube $a$ of the tire A by a metal pipe D' which is connected by a suitable union to a tube $D^2$ extending through a sleeve welded or similarly secured in the reservoir C, the connection of the tube $D^2$ to the inner tube being effected in any appropriate manner to produce an airtight joint. The connection of the valve D to the reservoir C is effected by a metal pipe $D^3$ which by means of any suitable union or the like is attached to a flanged tube $D^4$ welded and riveted to the reservoir C. The valve as shown in Figure 3 comprises two interfitted members $D^5$ and $D^6$ secured together by a coupling sleeve $D^7$ and connected respectively to the tire connecting pipe D' and the reservoir connecting pipe $D^8$. The member $D^5$ is formed with a series of passages $D^9$ branching from a central passage $D^8$ all of which passages terminate at the inner face of the member $D^5$ which face forms a seating for a disc valve or diaphragm $d$ having a small central opening $d'$ that registers with the central passage $D^8$ and with a central passage $D^{10}$ in the member $D^6$. The passage $D^{10}$ may be restricted by means of a perforated plug $d^{10}$ which may be formed as shown in Figure 18 to provide resistance to air flow. The said disc valve $d$ is capable of slight axial movement so as to be moved into or out of contact with the seating formed by the inner face of the member $D^5$ as hereinafter described. In this example the tire is inflated through a Schrader or any other type of tire valve $C^4$ attached to the reservoir C so that the air is pumped into the reservoir and passes through the valve D above described into the inner tube $a$ of the tire. Normally the air in the tire and the reservoir will be in a state of equilibrium while the wheel is at rest whether the load is on the tire or not. When however the wheel with its tire is in motion the balance of the air between the reservoir and the inner tube of the tire will be automatically and incessantly altered by reason of the tire encountering various obstacles, pot-holes, or other road irregularities so that when the tire is influenced by any irregularity or even a slight undulation a small amount of air is forced or transferred from the tire through the passages $D^8$ and $D^9$ and past the disc valve $d$ (which is therefore moved away from its seating) into the resistance passage $D^{10}$ and then to the reservoir C through the pipe $D^3$ thus automatically reducing the inflation pressure of the tire.

As the road irregularities decrease and the flexing of the tire becomes less the air is allowed to flow from the reservoir into the tire and in so doing the air issuing from the passage $D^{10}$ causes the disc valve to be forced against its seating thus closing all the passages $D^9$ leaving only the central passage $D^8$ open into which latter the air flows through the restricted opening in the disc valve so as to pass into the tire through the pipe $D^1$. In this manner the return flow of the displaced air is automatically effected but it is retarded or resisted, thus preventing recoil and generally improving the cushioning effect. The restoration of the normal inflation pressure in the tire will only take place when the tire is at rest and the flexing movement ceases.

Figures 4, 5, 6, 7, 8:
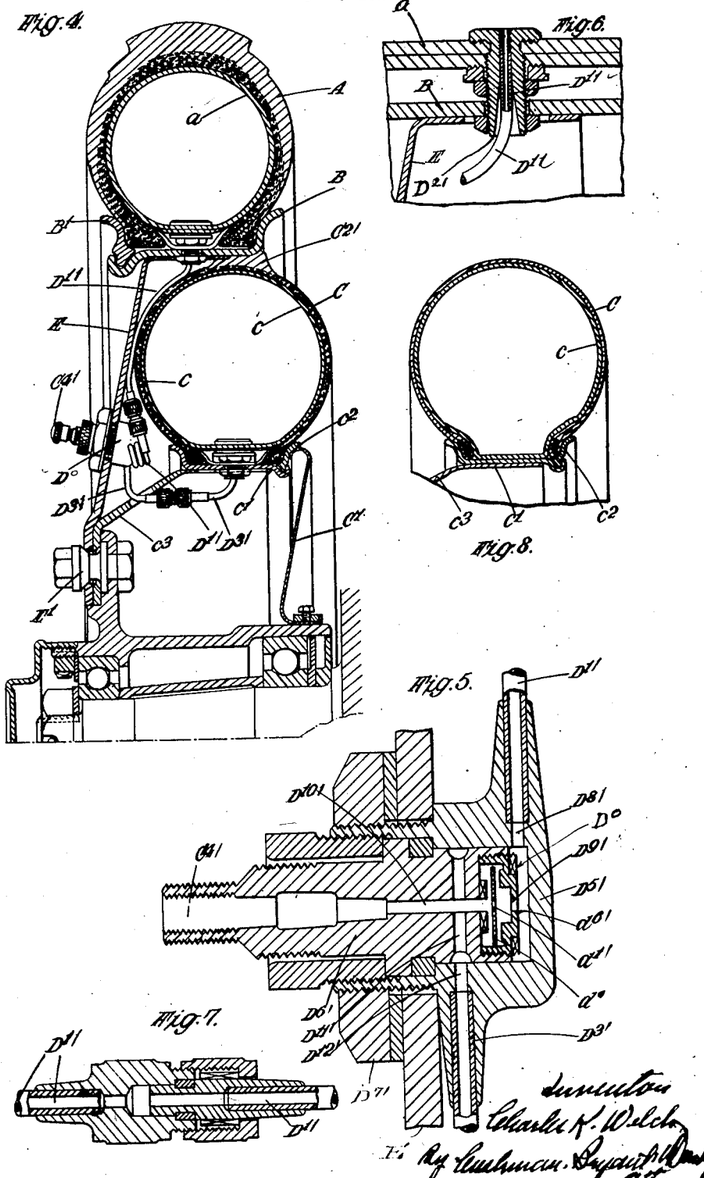
Figure 4 is a fragmentary sectional view of another construction of the improved wheel.
Figures 5, 6 and 7 are sectional views of details employed in the modification shown in Figure 4.
Figure 8 is a sectional view of a modified construction of reservoir which can be used in the modification shown in Figure 4.

The modification shown in Figure 4 is somewhat similar to that shown in Figure 1 so far as the position of the reservoir C in relation to the rim B is concerned and where possible the same indicating references are used to denote corresponding or similar parts. In this example the reservoir C comprises a flexible but inextensible jacket or cover (similar to an ordinary pneumatic tire outer cover) surrounding an inner tube $c$, the cover or jacket and the inner tube $c$ being fitted in a supplementary rim $c'$ having a detachable split flange $c^2$ similar to the rim and flange used with the ordinary straight sided cover as shown at A. The supplementary rim $c'$ is supported on an extension or coned ring $c^3$ which is clamped with the wheel disc E to the hub flange by the securing bolts E'. A detachable dust shield or cover C' is fitted to the hub and adapted to bear at its outer periphery against the detachable flange ring $c^2$ of the supplementary rim $c'$. The outer portion of the inextensible cover of the reservoir C is moulded or provided with a circumferential ridge $C^{21}$ to bear against the inner circumferential surface of the rim B. In this example the restricting device or means of resistance $D^0$ is fitted to the wheel disc E and is combined or associated with an inflating valve $C^{41}$ preferably of the Schrader type so that air may be pumped into the tire inner tube $a$ through the pipe $D^{11}$ and into the inner tube $c$ of the reservoir C through the pipe $D^{31}$. In this example the pipe $D^{11}$ is screwed and soldered into a plug or stem $D^{21}$ of the internal shape shown which is clamped to the tire inner tube $a$ and to the rim B by securing and locking nuts as shown in Figure 6. This method of connecting the pipe $D^{11}$ to the inner tube of the tire is of considerable importance as it affords special facility for manipulating the securing nuts which clamp the stem $D^{21}$ to the inner tube, and the same method is employed for connecting the pipe $D^{31}$ to the inner tube $c$ of the reservoir C. Each pipe $D^{11}$ and $D^{31}$ as shown in Figure 4 is provided with a union shown in section in Figure 7 for facilitating connection of the said pipes to the valve $D^0$ which pipes may be coiled as shown in Figure 1, to permit of adjustment when connecting the pipes. The valve $D^0$ in this example comprises two members $D^{51}$ and $D^{61}$ (see Figure 5) which are screwed together and secured to the wheel disc E by a securing nut $D^{71}$. The tire connecting pipe $D^{11}$ and the reservoir connecting pipe $D^{31}$ are connected to the member $D^{51}$ as shown. The member $D^{61}$ is adapted to receive the inflating valve $C^{41}$ and at its inner end contains the disc valve or diaphragm $d^0$ which is provided with a small central opening $d^{11}$ in register with the central passage $D^{101}$ in the member $D^{61}$. The central opening $d^{11}$ in the disc valve $d^0$ also registers with a central opening $D^{91}$ formed in a plug $d^{61}$ screwed into the member $D^{61}$ and adapted to form a seating for the disc valve as hereinafter described. The central opening $D^{91}$ in the said seating establishes communication between the passage $D^{101}$ and a passage $D^{81}$ in the member $D^{51}$ leading to the tire connecting pipe $D^{11}$ and the said passage $D^{101}$ is provided with branch passages $D^{111}$ for establishing communication with a passage $D^{121}$ in the member $D^{51}$ leading to the reservoir connecting pipe $D^{31}$. When inflating the tire and supplying air to the reservoir, air passes through the passage $D^{101}$ and flows through the branch passages $D^{111}$ into the reservoir connecting pipe $D^{31}$ and also issues from the end of the passage $D^{101}$ so as to flow through the opening $d^{11}$ in the disc valve $d^0$ thence through the opening $D^{91}$ into the pipe $D^{11}$ leading to the tire and it will be understood that normally the air pressures in the tire and the reservoir are in equilibrium. When the balance of the air pressures is upset by the tire encountering road irregularities as hereinbefore described a small amount of air is forced from the tire through the pipe $D^{11}$ so as to flow through and past the disc valve $d^0$ into the passage $D^{101}$ from which it passes into the pipe $D^{31}$ leading to the interior of the reservoir C. The displaced air when permitted to return to the tire flows through the passage $D^{101}$ and in issuing therefrom forces the disc valve $d^0$ against its seating so that the air can only flow through the restricted central opening $d^{11}$ in the disc valve in returning to the tire through the opening $D^{91}$ and the connecting pipe $D^{11}$; in this manner the return of the air to the tire is retarded or resisted for the purpose hereinbefore set forth. Instead of using an inextensible flexible jacket or cover as part of the receiver as shown in Figure 4 a rigid jacket or cover as shown in Figure 8 may be employed for surrounding an inner tube $c$. This jacket may be made of steel, copper, aluminium, or other metal shaped like a pneumatic tire cover with bead portions reinforced by a series of endless wires or a coiled wire, these edges being retained on a supplementary rim $c'$ as shown in Figure 4.

Figures 9, 10:
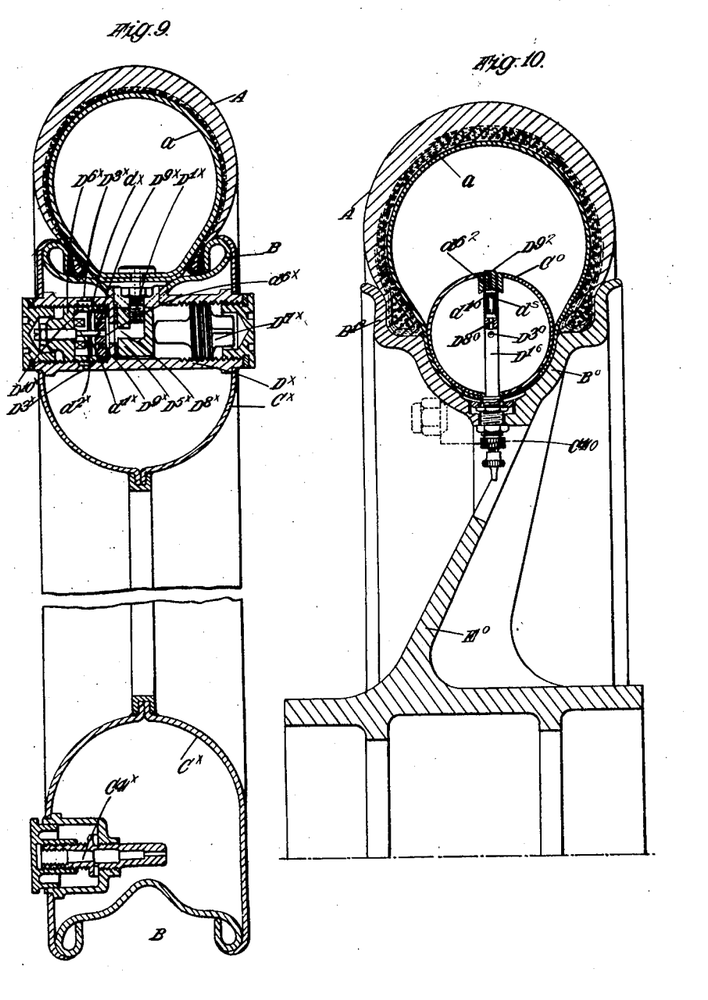
Figure 9 is a fragmentary sectional view of another form of wheel in which the reservoir forms part of the wheel rim the top half of this figure showing the restricting valve mechanism in section and the lower half showing the connection for the inflating valve.
Figure 10 is a fragmentary sectional view of another construction of wheel in which the reservoir is fitted partly within the tire.

The wheel illustrated in Figure 9 is substantially different in general construction and design from that illustrated in Figure 1 or in Figure 4 and in this example the reservoir $C^x$ is constituted by a metal chamber formed of two halves suitably welded and secured together at the inner circumference and also welded or otherwise secured to the rim B which in this example may be adapted to receive an ordinary wired-on tire A as shown. The restricting valve or resistance means is mounted in the said reservoir or hollow rim the various parts being housed in a casing $D^x$ welded or similarly secured to the sides of the reservoir. The inner tube $a$ of the tire is connected by a tube $D^{1x}$ screwed in an L-shaped passage $D^{8x}$ in a plug or block $D^{5x}$ which is maintained against one side of a perforated abutment in the casing $D^x$ by a screwed plug or the like $D^{7x}$. A plug $D^{6x}$ is also screwed in the casing $D^x$ against the other side of the abutment and it contains a valve seating $d^{6x}$ having a series of apertures $D^{9x}$ as shown. A disc valve $d^x$ having a central opening $d^{1x}$ is mounted on an adjustable screw $d^{2x}$ formed with a coned point for adjusting the central passage or opening $D^{9x}$ in the seating $d^{6x}$. The plug $D^{6x}$ is formed with an opening or openings $D^{10x}$ which register with openings $D^{3x}$ leading into the interior of the reservoir $C^x$. The ends of the valve casing $D^x$ may be closed by readily removable screw plugs as shown. The tire is inflated by any suitable type of valve which may be supported in a casing combined with a valve cap and dust cover fixed in the side of the reservoir as indicated at $C^{4x}$ so that when the air is being pumped through the valve $C^{4x}$ it is forced into the reservoir $C^x$ and flows through the openings $D^{3x}$ whence it passes through the central opening $d^{1x}$ in the disc valve $d^x$ into the passage $D^{8x}$ leading to the connection $D^{1x}$ establishing communication with the interior of the tire. As in the foregoing examples, the air which is forced from the tire during the running of the same, passes more or less freely through the passage $D^{8x}$ and all the openings $D^{9x}$ so as to flow past the disc valve $d^x$ thence through the openings $D^{10x}$ and $D^{3x}$ into the reservoir. The retarded or resisted return of the air is effected by reason of the disc valve $d^x$ being forced against its seating so as to close the openings $D^{9x}$ with the exception of the central one which registers with the central opening $d^{1x}$ in the disc valve and through which the air is allowed to pass into the passage $D^{8x}$ whence it passes into the inner tube $a$.

In the modification illustrated in Figure 10 the reservoir $C^0$ instead of being arranged within the inner circumference of the rim is disposed on the outer side of the rim so that it is partially contained within the tire A. In this example the rim is made divisible and one bead seating $B^0$ is formed at the periphery of a disc $E^0$ secured to or forming part of the wheel hub whilst the other bead seating $B^{10}$ is formed on a detachable flange which together with a suitable part of the wheel disc $E^0$ forms a rim channel semi-circular in cross section to receive the reservoir $C^0$. The reservoir may be constructed as an endless metal tube so as to form an incompressible rigid partition between the interior of the inner tube $a$ and the interior of the reservoir, the inner tube surrounding the reservoir as shown. The connection between the interior of the inner tube and the interior of the reservoir is effected by means of a pipe or tube $D^{16}$ which at its inner end is secured to an inflating valve $C^{40}$. The outer end of the tube $D^{16}$ makes a sliding fit in a boss or internal projection on the reservoir and it is provided at its outer end with a screw plug $d^{62}$ having a restricted or resisting bore or passage $D^{92}$. The pipe $D^{16}$ also contains a centrally bored valve $d^8$ in the form of a fluted cylinder similar to that shown in Figure 16 which upon the air being transferred from the tire due to irregularities in or on the road surface, is held away from its seating formed by the plug $d^{62}$ so that the air may flow along the flutings into the central passage $D^{80}$ in the pipe $D^{16}$ and through a lateral opening $D^{30}$ into the reservoir. When however the displaced air returns to the tire it causes the valve to be moved against its seating $d^{62}$ so that the air can only flow through the central resisting bore $d^{10}$ of the fluted valve $d^8$ and into the restricted or resisting passage $D^{92}$ leading into the inner tube $a$. The convex portion of the reservoir $C^0$ projecting into the outer cover may be reinforced or extended to any desired extent but it need only be of light construction owing to the fact that it is only subjected to the difference of pressure which may exist between the air in the reservoir and the air in the tire.

Figures 11, 12, 13:
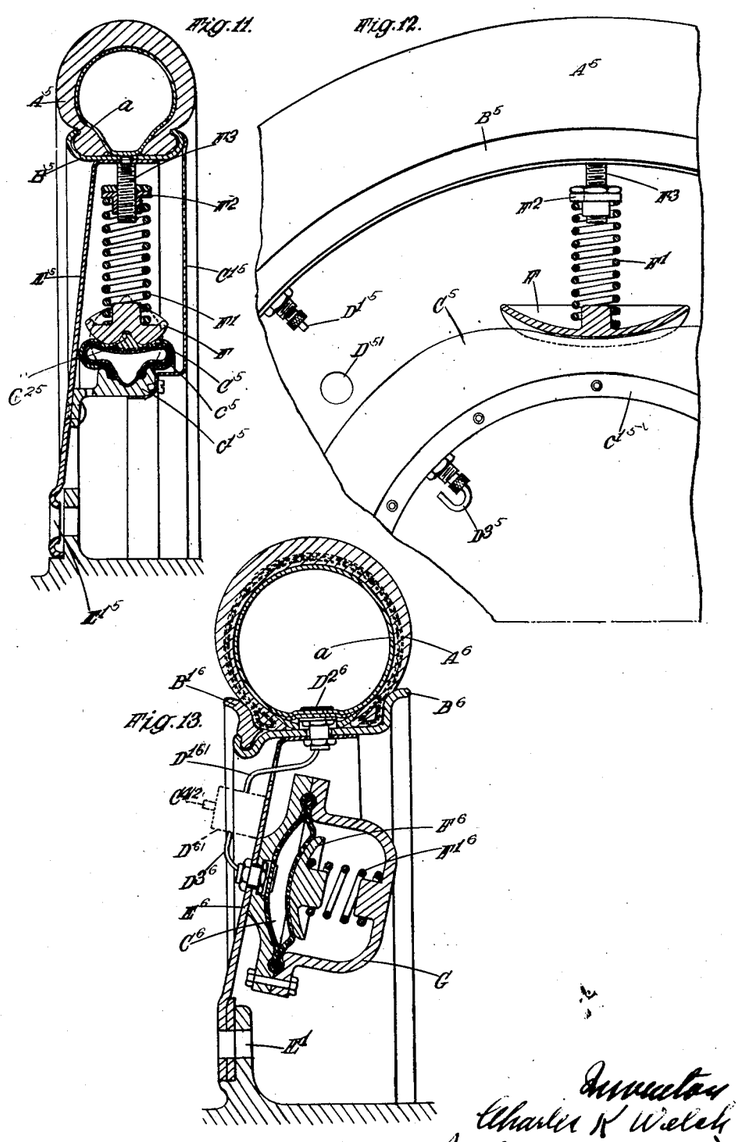
Figures 11 and 12 are respectively a fragmentary sectional view and fragmentary front view of one construction in which spring devices are associated with the reservoir.
Figure 13 is a fragmentary sectional view of another construction in which the reservoir is associated with spring devices.

Figures 11 and 12 illustrate a construction in which a reservoir is acted upon or compressed by spring means. The reservoir $C^5$ is shown as comprising a flexible, but inextensible cover or jacket having wired edges and surrounding an inner tube $c^5$, the reservoir so formed being supported in a supplementary rim $c^{15}$ secured to the wheel disc $E^5$, which is bolted at $E^{15}$ to the hub flange and carries a rim $B^5$. The tire $A^5$ shown in this example is of the beaded edge type but any other kind of tire may be used. At one or more positions around the wheel the reservoir is compressed by a spoon shaped plunger F which is under the influence of a compression spring F' bearing at its outer end against an adjustable abutment $F^2$ in the form of a nut and lock nut threaded on a screw stem $F^3$ fixed to the wheel rim $B^5$. For the purpose of preventing lateral displacement of the plunger F, the latter is recessed to fit over a ridge or projection $C^{25}$ formed on the outer cover or jacket of the reservoir $C^5$. A dust shield or cover $C^{15}$ is secured to the inner side of the wheel by being screwed to the supplementary rim $c^{15}$, so as to bear against the edge of the rim $B^5$ as shown. In this example an air resisting device combined with an inflation valve as shown in Figure 5 may be secured to the wheel disc $E^5$ at the position indicated at $D^{51}$ in Figure 12, the resisting valve being connected to the pipes $D^{15}$ and $D^{35}$ leading to the tire and the reservoir respectively as hereinbefore described with reference to the example shown in Figures 4, 5 and 6. In the case of two or more spring controlled plungers F being provided, they are arranged around the wheel to balance each other, so as to prevent the wheel from being unequally weighted. A modified construction comprising a spring influenced reservoir or air receiving chamber is illustrated in Figure 13, which again shows a disc wheel having a rim $B^6$ and a detachable flange $B^{16}$ for use with a straight sided tire $A^6$. At one or more positions around the wheel a comparatively small rubber container or reservoir $C^6$ reinforced with canvas or the like is clamped between the parts of a bi-part casing G secured to the wheel disc E⁶, the said reservoir being free and flexible at one side so as to form a kind of diaphragm which is under the influence of a plunger F⁶ acted upon by a spring F¹⁶ housed in the casing G as shown. The strength of the spring or springs F¹⁶ may vary to suit different conditions and air pressures, and may be adjustable if desired. The said container or reservoir C⁶ may be connected to the inner tube $a^6$ of the tire by plug D²⁶ and pipes D¹⁶¹ and D³⁶ which are connected to a resisting device diagrammatically indicated at D⁶¹ and preferably the said restricting valve or device is combined with an inflating valve as shown in Figures 4 and 5, the pipe D¹⁶¹ and D³⁶ being connected to the inner tube, and the reservoir as shown in Figure 6. If more than one spring influenced reservoir be employed they would be arranged around the wheel in such positions as to balance each other, and the reservoirs would be connected so that only one resisting device D⁶¹ and one inflating valve C⁴² need be employed. Spring devices, particularly of the kind shown in Figure 13, may be employed in conjunction with any form or size of flexible reservoir in order to afford additional elasticity.

Any suitable arrangement comprising a number of reservoirs or air receivers may be employed and such may be interconnected or independent and connected to the tire in any appropriate manner and if desired spring means may be associated with the reservoirs or the like.

The rim B⁶ in Figure 13 is slightly coned in the direction shown and the outer bead of the tire cover may be of slightly less diameter than the inner bead so that the two beads make a proper fit on the slightly coned rim. This arrangement facilitates the attachment and removal of the tire and also partly compensates for the cant of the steering wheels, whilst it also assists in preventing lateral displacement of the driving wheel tires when taking excessive curves. This particular arrangement of tire cover and coned rim may be employed in any construction of wheel.

Figure 14:
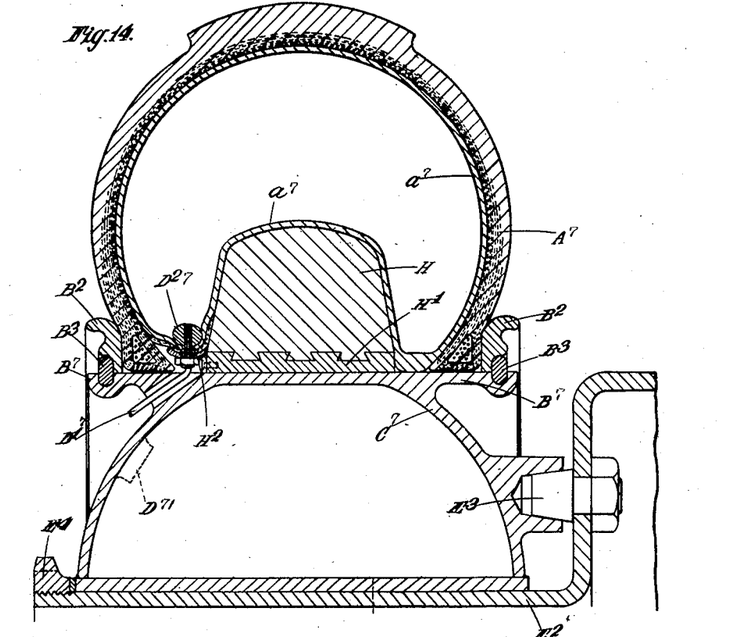
Figures 14 and 15 are fragmentary sectional views illustrating the invention applied in two ways to two constructions of wheels fitted with giant tires.
Figure 15:
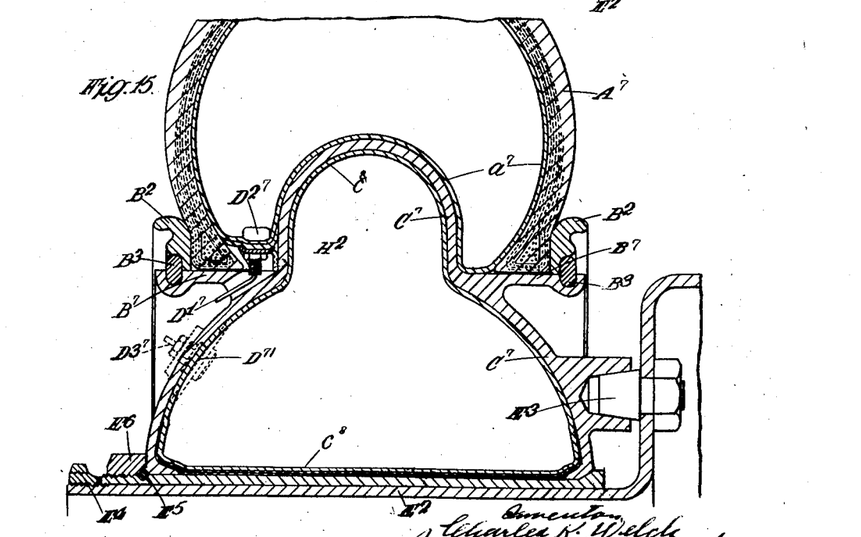

Figures 14 and 15 show examples of the invention applied to wheels fitted with giant tires and they also illustrate a reservoir extending from the rim to the hub. In the example shown in Figure 14, the reservoir is constituted by an arch-sectioned member which is welded or otherwise secured to a sleeve so as to form an airtight chamber, the said chamber being detachably fitted on the wheel hub E², and retained in position by studs E³ engaging with recessed bosses on the reservoir and by a nut E⁴ at the outer end of the hub. The outer part of the reservoir is formed with integral rim flanges B⁷ on which the beads of the tire cover A⁷ are seated and retained by endless flanged rings B² in conjunction with split rings B³ which latter fit in grooves at the edges of the rim flanges B⁷. An annular projection or convexity is provided around the reservoir C⁷ so as to be positioned within the tire and in the example shown the projection may be in the form of a solid rubber tire H on a metal foundation band H' which may be retained in the central position by any suitable means which may be interposed between the tire beads and the edges of the foundation band. As shown the inner tube $a^7$ is adapted to fit around the convexity or projection formed by the solid tire which projection serves to prevent the tire from being collapsed on the rim in the event of unrequired deflation and also to reduce the "drop" as hereinbefore explained. At any suitable position on the reservoir C⁷, for example, as indicated at D⁷′, a combined air resisting device and inflation valve generally similar to that shown in Figure 5, may be fitted, the resisting device being connected to the inner tube by a pipe D¹⁷ so that communication is established between the inner tube A⁷ and the interior of the reservoir, the resisting device in this case is such that a reservoir connecting pipe D³⁷ such as employed in certain of the previous examples need not be employed. The pipe D¹⁷ may be clamped to the inner tube by a projection or head D²⁷ on the end of this pipe and a securing nut bearing against a flange H² screwed or otherwise secured to the foundation band H' of the rubber tire or convexity H. Instead of employing an annular projection or convexity such as H the reservoir C⁷ may be so formed as to project beyond the rim flanges B⁷ into the tire space as shown in Figure 15. The constructional features in this example are generally similar to those described in connection with Figure 14 and the same references are used to denote corresponding parts. In this example, however, the reservoir is provided with an inner tube $c^8$, the reservoir casing may be detachably retained on a sleeve surrounding the hub E² by a split security ring E⁵ and a nut E⁶, the sleeve itself being retained on the hub by a nut E⁴.

Figure 16:
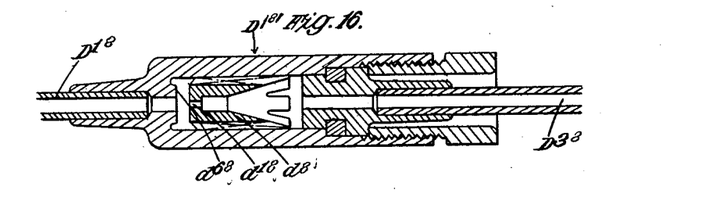
Figures 16 and 17 are sectional detail views of modified restricting valves.
Figure 17:
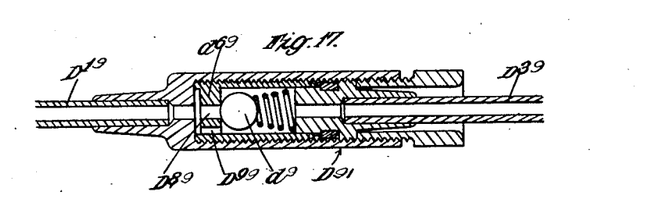

Various forms of resisting devices may be employed in connection with any of the examples illustrated, and two modifications of restricting valves are shown on an enlarged scale in Figures 16 and 17. In Figure 16, the valve proper is constituted by a centrally bored cylinder $d^8$ whose external surface is fluted, as hereinbefore referred to with reference to Figure 10 this valve being slidable in a casing D¹⁸¹ to which if desired connecting pipes D¹⁸ and D³⁸ leading to the tire and the reservoir respectively may be attached. When air is transferred from the tire to the reservoir the fluted valve $d^8$ is displaced so that air flows along the flutings and through the central bore $d^{18}$ but when the air returns from the reservoir to the tire the valve is moved against the seating $d^{68}$ so that the air can only flow through the restricted or resisting bore $d^{18}$ into the pipe $D^{18}$ leading to the tire.

Figure 19:
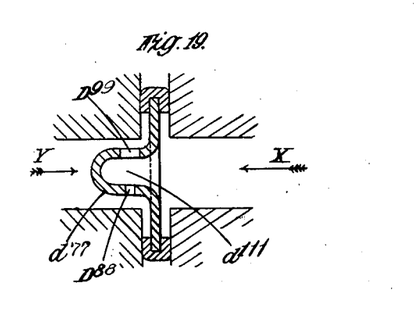
Figure 20:
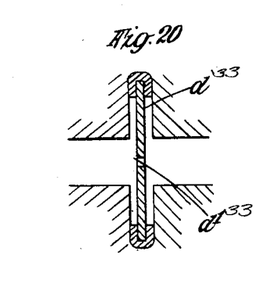
Figure 21:
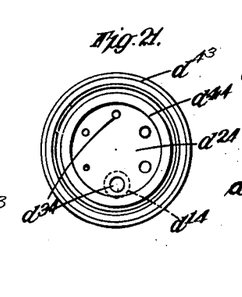
Fig. 21 is an end view of Fig. 22.
Figure 22:
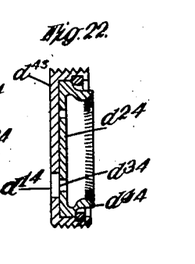

Figure 17 shows a resisting device $D^{91}$, comprising a spring controlled ball $d^9$ which acts as a valve for normally closing a passage $D^{89}$ in the valve seating $d^{69}$ leading to the tire and when the air is transferred from the tire the ball valve is forced away from its seating so that the air passes through the central passage $D^{89}$ and also through an additional opening $D^{99}$ so as to flow through the passage leading to the reservoir, for example, through a pipe $D^{39}$. Upon the air flowing in the return direction, the ball valve is moved to engage with its seating and thus closes the passage $D^{89}$ so that the air can only flow through the restricted opening $D^{99}$ into the connection $D^{19}$ leading to the tire. Instead of or in addition to employing movable valves such as hereinbefore referred to, I may provide a resisting device which by reason of its formation allows air to pass more freely in one direction than the other. One example of such a device is illustrated on an enlarged scale in Figure 18. The arrow X represents the direction of flow of air from the tire to the reservoir, and the arrow Y indicates the direction of the air flow from the reservoir to the tire; $d^{22}$ indicates the resisting device which is placed in any suitable position in the passage between the tire and the reservoir whilst $d^{19}$ represents the specially formed passage which at one end terminates in a perforated cone to form a restricted opening and by reason of this construction air can flow more freely in the direction of the arrow X than in the other direction indicated by the arrow Y. Figure 19 shows on an enlarged scale a modified form of resisting device which is in the form of a flanged dome $d^{77}$ provided with restricted apertures $D^{88}$ and $D^{99}$ (which may be unequal as shown or equal) leading into a central opening $d^{111}$ as shown. In this case the arrow X represents the direction of air flow from the tire to the reservoir and it will be understood that the air passes into the central opening $d^{111}$ and through both the said apertures. The arrow Y represents the direction of the air flow from the reservoir to the tire, and owing to the shape of the device $d^{77}$ a small restricted passage is formed around the restricted apertures $D^{88}$ and $D^{99}$ through which the air flows to the tire. In some cases a device which affords an equally restricted or resisting passage or opening in both directions may be provided, and an example of such device is shewn in Figure 20 which comprises a disc $d^{33}$ having a small central perforation $d^{133}$ which disc may be disposed in any suitable position between the tire and the reservoir. A device of this character may be adjustable so as to vary the size of the restricted or resisting opening as may be required and an example of such an arrangement is shown in Figures 21 and 22 in which a plug $d^{43}$ having an opening $d^{14}$ is suitably fitted in the air passage from the tire to the reservoir; associated with this plug is a rotatable disc $d^{24}$ which is provided with a series of different sized holes $d^{34}$ which can be brought into register with the opening in the plug in order to vary the size of the restricted opening establishing communication between the tire and the reservoir. For adjusting the disc $d^{24}$ a knurled or milled flange $d^{44}$ may be formed thereon for enabling the disc $d^{24}$ to be rotated by a finger inserted in the said flange.

With regard to the size of the air passage between the tire and the reservoir the drawings show connecting pipes with a bore of about $\frac{1}{16}$th inch. Considering the amount of air that passes in practice between the tire and the reservoir, a pipe with $\frac{1}{16}$th inch bore may be regarded as the minimum free passage and any means introduced into the connecting pipe or passage having the effect of retarding the passage of air may be considered as a restricted passage for the purpose of this invention. For example, in connection with a tire 32 inches by 4½ inches, a .041 inch hole forms a resisting means which gives satisfactory results, but in some respects better results are obtained with a .025 inch hole. The arrangement may be such that the air passes from the tire to the reservoir through say a .041 inch hole or opening and returns from the reservoir to the tire through a smaller opening. The above sizes for the restricted passages are given by way of example, and larger or smaller openings may be used so long as the desired means of resistance is provided. With different sizes of tires the restricted passages or resisting means may vary according to the air capacity of the tire.

The device interposed in the connection between the tire and the reservoir may be termed a timed or differential device since if the tire is suddenly flexed to cause a sudden injection of air into the container, means are provided comprising bleed holes or vents to allow the air to return later and so prevent re-coil. It is obvious that the larger the bleed holes or hole, the faster the return of the air to the tire will take place, and conversely, the smaller the holes, the slower the return of the air to the tire will be. Therefore, it is necessary in constructing the device to conduct physical tests in order to determine the size of the passage or resistance that will give the desired length of time necessary for the return of the air to the tire, in order to get the best all around or practical results. These, of course, vary with the size of the tire, the capacity of the reservoirs and the load to be carried.

It will be understood that the invention may be carried out in many different ways and applied to various types of wheels. The wheels illustrated are generally intended for motor vehicles, and it will be understood that suitable constructions may be devised with wire spokes, wood spokes, tubular spokes or other members between the hub and rim. Wheels having the invention applied thereto may be designed for pedal bicycles, motor cycles and the like. The invention may be applied to the ground wheels of aircraft in which case it is particularly advantageous as it prevents excessive recoil when the aircraft lands.

What I claim and desire to secure by Letters Patent of the United States is:—

1. A pneumatic tire having in combination a container, a conduit communicating with said container and adapted to be attached to and to communicate with the interior of the tire, and a flow restrictor in said conduit so arranged that air may pass more readily from the tire to the container, than from the container to the tire.

2. The combination with a wheel adapted to carry a pneumatic tire, of a container carried by said wheel, a conduit communicating with said container and adapted to be attached to the tire, and a flow restrictor in said conduit arranged so that air may pass more readily from the tire to the container, than from the container to the tire.

3. The combination with a wheel, of a pneumatic tire on said wheel, a container carried by said wheel, a conduit connecting the interiors of the tire and the container, and a flow restrictor in said conduit arranged so that air may pass more readily from the tire to the container, than from the container to the tire.

4. The combination with a wheel adapted to carry a pneumatic tire, of a container carried by said wheel, a conduit communicating with said container and adapted to be attached to the said tire, and a disc having a small aperture located in and across the said conduit.

5. The combination with a wheel adapted to carry a pneumatic tire, of a container carried by said wheel, a conduit communicating with said container and adapted to be attached to the tire, and means whereby the air flow in said conduit can be varied, said means including an apertured disc located in and across said conduit.

6. The combination with a wheel, a pneumatic tire on said wheel, a container carried by said wheel, a conduit connecting the interior of said tire and the container, a member having a restricted opening mounted in said conduit, and means coacting with said member whereby the air may pass more freely to the tire from the container than from the container to the tire.

7. The combination with a wheel adapted to carry a pneumatic tire, of a container carried by said wheel, a conduit communicating with said container and adapted to be attached to the tire, a disc having a small aperture movably mounted in and across said conduit, and seatings in said conduit with which said disc cooperates for enabling air to pass more readily from the tire to the container, than from the container to the tire.

8. The combination with a wheel adapted to carry a pneumatic tire, of a container carried by said wheel, a conduit communicating with said container and adapted to be attached to the tire, a disc having a small aperture movably mounted in and across said conduit, and a seating having openings in communication with said conduit against which seating the disc can be pressed to close said openings and to provide a restricted passage for the flow of air in one direction, the disc being movable away from the said openings when air flows in the opposite direction to permit the air to flow more freely.

CHARLES KINGSTON WELCH.